US006970942B1

(12) United States Patent
King et al.

(10) Patent No.: US 6,970,942 B1
(45) Date of Patent: Nov. 29, 2005

(54) METHOD OF ROUTING HTTP AND FTP SERVICES ACROSS HETEROGENEOUS NETWORKS

(75) Inventors: Steve King, Portland, OR (US); Paul M. Stillwell, Jr., Aloha, OR (US); Chiayin Mao, Beaverton, OR (US)

(73) Assignee: Crossroads Systems, Inc., Austin, TX (US)

( * ) Notice: Subject to any disclaimer, the term of this patent is extended or adjusted under 35 U.S.C. 154(b) by 744 days.

(21) Appl. No.: 09/707,428

(22) Filed: Nov. 7, 2000

Related U.S. Application Data

(60) Provisional application No. 60/202,717, filed on May 8, 2000.

(51) Int. Cl.⁷ ............................................. G06F 15/173
(52) U.S. Cl. ...................... 709/238; 709/203; 709/224; 709/227; 379/229; 379/230
(58) Field of Search ............................... 709/238, 203, 709/224–229; 379/229–230; 455/403, 463

(56) References Cited

U.S. PATENT DOCUMENTS

| | | | | |
|---|---|---|---|---|
| 5,535,375 A | * | 7/1996 | Eshel et al. .................. | 703/27 |
| 5,812,768 A | * | 9/1998 | Page et al. ................... | 709/228 |
| 5,978,578 A | | 11/1999 | Azarya et al. ............... | 395/701 |
| 5,987,504 A | * | 11/1999 | Toga ........................... | 709/206 |
| 6,044,407 A | * | 3/2000 | Jones et al. .................. | 709/246 |
| 6,145,001 A | * | 11/2000 | Scholl et al. ................ | 709/223 |
| 6,219,790 B1 | * | 4/2001 | Lloyd et al. ................. | 713/201 |
| 6,256,739 B1 | * | 7/2001 | Skopp et al. ................. | 713/201 |
| 6,266,701 B1 | * | 7/2001 | Sridhar et al. ............... | 709/232 |
| 6,389,130 B1 | * | 5/2002 | Shenoda et al. ........ | 379/221.08 |
| 6,393,014 B1 | * | 5/2002 | Daly et al. ................... | 370/352 |
| 6,400,730 B1 | * | 6/2002 | Latif et al. ................... | 370/466 |
| 6,427,071 B1 | * | 7/2002 | Adams et al. ............... | 455/403 |
| 6,654,794 B1 | * | 11/2003 | French ......................... | 709/217 |

FOREIGN PATENT DOCUMENTS

| | | |
|---|---|---|
| WO | WO 98/37688 | 8/1998 |
| WO | WO 99/45691 | 9/1999 |

\* cited by examiner

*Primary Examiner*—Ario Etienne
*Assistant Examiner*—LaShonda Jacobs
(74) *Attorney, Agent, or Firm*—Sprinkle IP Law Group

(57) ABSTRACT

A method and system for routing data across heterogeneous networks. In one embodiment, a heterogeneous network comprises a specialized in-band network that is privately accessible within the heterogeneous network, as well as an out-of-band network that is coupled to the in-band network by a switching platform. A client on the out-of-band network is configured to transmit a request for server data to the switching platform. The request is formatted according to the protocol of the out-of-band network and may take the form of a uniform resource locator (URL). The switching platform is configured to recognize the request as one which is directed to a server on the in-band network. The switching platform parses the request to determine the requested data and reformats this information as a new request that is transmitted to the server according to the protocol of the in-band network. The server provides data responsive to the new request, which is transmitted back to the switching platform according to the protocol of the in-band network. The switching platform then reformats the responsive data according to the protocol of the out-of-band network and transmits it to the client. The switching platform is separate from the default gateway and proxy servers.

10 Claims, 4 Drawing Sheets

HTTP://IP_ADR\PROFILE_A\IP_ADR_REMOTE\. . .

METHOD OF ROUTING HTTP AND FTP SERVICES ACROSS HETEROGENEOUS NETWORKS

This application claims the benefit of the filing date of U.S. Provisional Patent Application Ser. No. 60/202,717 by inventors Steve King, Paul Stillwell and Andy Mao, entitled "Method for Routing HTTP and FTP Services Across Heterogeneous Networks," filed on May 8, 2000.

TECHNICAL FIELD OF THE INVENTION

The present invention relates in general to the field of electronic devices, and more particularly to an improved method and system for routing data such as HTTP and FTP data across heterogeneous networks.

BACKGROUND OF THE INVENTION

Networks may contain a variety of devices which are all coupled to a network medium. The "devices" may include not only individual devices, such as workstations and printers, but also other networks. Typically, the devices on a network are managed through a single one of the devices on the network which queries the other devices for information relevant to management of the system. If the queried devices are on a network other than the network to which the management device is connected, the queries are routed through the respective networks to the queried devices.

In some networks, management functions are performed through an administrator's workstation which is coupled to the network. The workstation may use a browser to retrieve information on the network devices. The browser is simply pointed to the appropriate devices and the web pages served by the devices are viewed by the administrator on the browser. Management of the network may also involve the transfer of data from devices on the network to the administrator's workstation using file transfer protocols. (It should be noted that, while the examples herein generally refer to the management of network devices, the disclosed methods are applicable to other functions which involve the routing of data across heterogeneous networks.

Some systems may include networks which use different, incompatible protocols. For instance, a system may have an ethernet coupled to a Fibre Channel network. Such a system may be referred to as a heterogeneous network. The presence of the incompatible networks may, for example, result from the need for an esoteric or expensive medium to support particular devices such as storage units (e.g., in a storage area network, or SAN). While such an esoteric or expensive medium may be necessary for particular devices, it is often not suitable for distribution of data to devices such as an administrator's workstation.

In heterogeneous network systems, the specialized network (e.g., a Fibre Channel network) is normally a private network that can be accessed only within the system. In other words, it is not publicly accessible from external networks such as the internet. The specialized network is therefore often referred to as an "in-band" network. Conversely, the network to which it is coupled (which is typically externally accessible) is referred to as an "out-of-band" network.

Because the management of heterogeneous network systems is typically handled through an administrator's workstation on the out-of-band network, the incompatibility of the in-band and out-of-band protocols create some difficulty in accessing and managing the devices on the in-band network. In other words, where an administrator can easily request web pages from devices on homogeneous networks and receive responsive web pages, it is not a simple matter to retrieve web pages from devices on the in-band portion of a heterogeneous network.

There are a number of approaches to overcoming these difficulties. One potential solution to this problem would be to incorporate some of the traditional IP gateway functionality into a special purpose gateway to support both the in-band and out-of-band networks. The special purpose gateway would be used as the default gateway for the network and to route IP traffic between the networks. One of the drawbacks of this scheme is that most networks already have default gateway routers in place. Devices on the out-of-band network cannot be reconfigured to use both the special purpose gateway and the gateway that previously served as the default gateway. If the special purpose gateway does not incorporate all of the functionality of the original default gateway, connectivity to the rest of the corporate local area network (LAN) and the internet may be lost. On the other hand, including all of the functionality of the original default gateway requires extensive re-engineering and associated expense.

Another solution would be to use a special purpose proxy server that supports the in-band and out-of-band networks. The proxy would convert messages from one network into messages which are transportable on the other network. One of the drawbacks of this solution is very similar to the problem with the default gateway—most corporate networks already have proxy servers for local clients, and the clients cannot be reconfigured to use the special purpose proxy server without losing connectivity to the existing (default) proxy server. Alternatively, building all of the functionality of the default proxy server into the special purpose proxy server would involve extensive re-engineering and would increase the cost so much that it would be impractical.

A third solution would be to provide all HTTP and FTP server functionality in the network to support both the in-band and out-of-band networks. This would involve using a custom protocol to retrieve data from the in-band devices. As a result, standard HTTP and FTP services could not be used in the in-band devices. Further, the development of a custom protocol would require a duplication of the engineering effort to address all of the same issues that have already been solved by the standards.

Another solution would be to try to incorporate the web pages for all the disparate devices into the one platform that has an interface to the out-of-band network. This creates another problem, however—keeping the platform up to date if any of the web pages change. From an engineering point of view, this solution requires more intelligence to be concentrated in one spot than is desirable, and further requires substantial engineering in its own right.

Another solution would be to physically implement the out-of-band network so that each device, including those connected to the in-band network, is coupled to the out-of-band network and is accessible by the administrator. The problems with this solution include the expense of the additional hardware, the possibility that, physically, there may not be available space in the out-of-band network, and additional maintenance will likely be required as a result of the necessary hardware.

Yet another solution would be to require that the management workstation to be coupled directly to the in-band network. This typically is not practical because in-band networks such as Fibre Channel networks generally are not appropriate for distribution of data to the workstation.

SUMMARY OF THE INVENTION

One or more of the problems outlined above may be solved by the various embodiments of the invention which, broadly speaking comprises a method and system for routing data across heterogeneous networks.

In one embodiment of the invention, there is provided a system for routing data across a heterogeneous network. The heterogeneous network comprises a specialized in-band network that is privately accessible within the heterogeneous network, as well as an out-of-band network that is coupled to the in-band network by a switching platform such as a network switch. The out-of-band network may be accessible to and from external networks such as the internet via a default gateway, proxy server or similar means. A client is connected to the out-of-band network, and a server is connected to the in-band network.

In this embodiment, the client is configured to transmit a request for server data to the switching platform. The request is formatted according to the protocol of the out-of-band network and may take the form of a uniform resource locator (URL). The switching platform is configured to recognize the request as one which is directed to the server. The switching platform parses the request to determine the requested data and reformats this information as a new request that is transmitted to the server according to the protocol of the in-band network. The server provides data responsive to the new request, which is transmitted back to the switching platform according to the protocol of the in-band network. The switching platform then reformats the responsive data according to the protocol of the out-of-band network and transmits it to the client.

In another embodiment, there is provided a method for routing data such as TCP service information across a heterogeneous network having an in-band network and an out-of-band network coupled to each other via a network switching platform. The method includes the steps of generating in a client on the out-of-band network a URL, transmitting the URL to the switching platform according to the protocol of the out-of-band network, parsing the request in the switching platform, reformatting the request as a new URL, transmitting the new URL to a server on the in-band network, generating data in the server in response to receiving the new URL, transmitting the data to the switching platform according to the protocol of the in-band network, reformatting the data in the switching platform and transmitting the data to the client according to the protocol of the out-of-band network. In this embodiment, the URL formulated by the client includes an address corresponding to the switching platform, a predetermined key word, an address corresponding to a server on the in-band network and a subject identifying the requested data. The switching platform receives the URL, identifies the keyword, and parses the URL based upon a URL format indicated by the keyword.

One technical advantage of the present system and method is that they may simplify device management by allowing a unified FTP and/or HTTP interface to network components on both in-band and out-of-band networks. Yet another technical advantage of the present system and method is that they may allow each network component to independently provide HTTP and/or FTP services. This simplifies development efforts since changing the services on one component need not affect the services on other components. Still another technical advantage of the present system and method is that they may require no change to the client TCP, proxy or default gateway configurations. Yet another technical advantage of the present system and method is that they may leverage robust, existing standards and eliminate engineering effort that would otherwise be spent developing custom protocols.

BRIEF DESCRIPTION OF THE DRAWINGS

Other objects and advantages of the invention may become apparent upon reading the following detailed description and upon reference to the accompanying drawings in which:

FIG. 4 is an example of a universal resource locator employed by one embodiment of the present invention.

Figure 1:
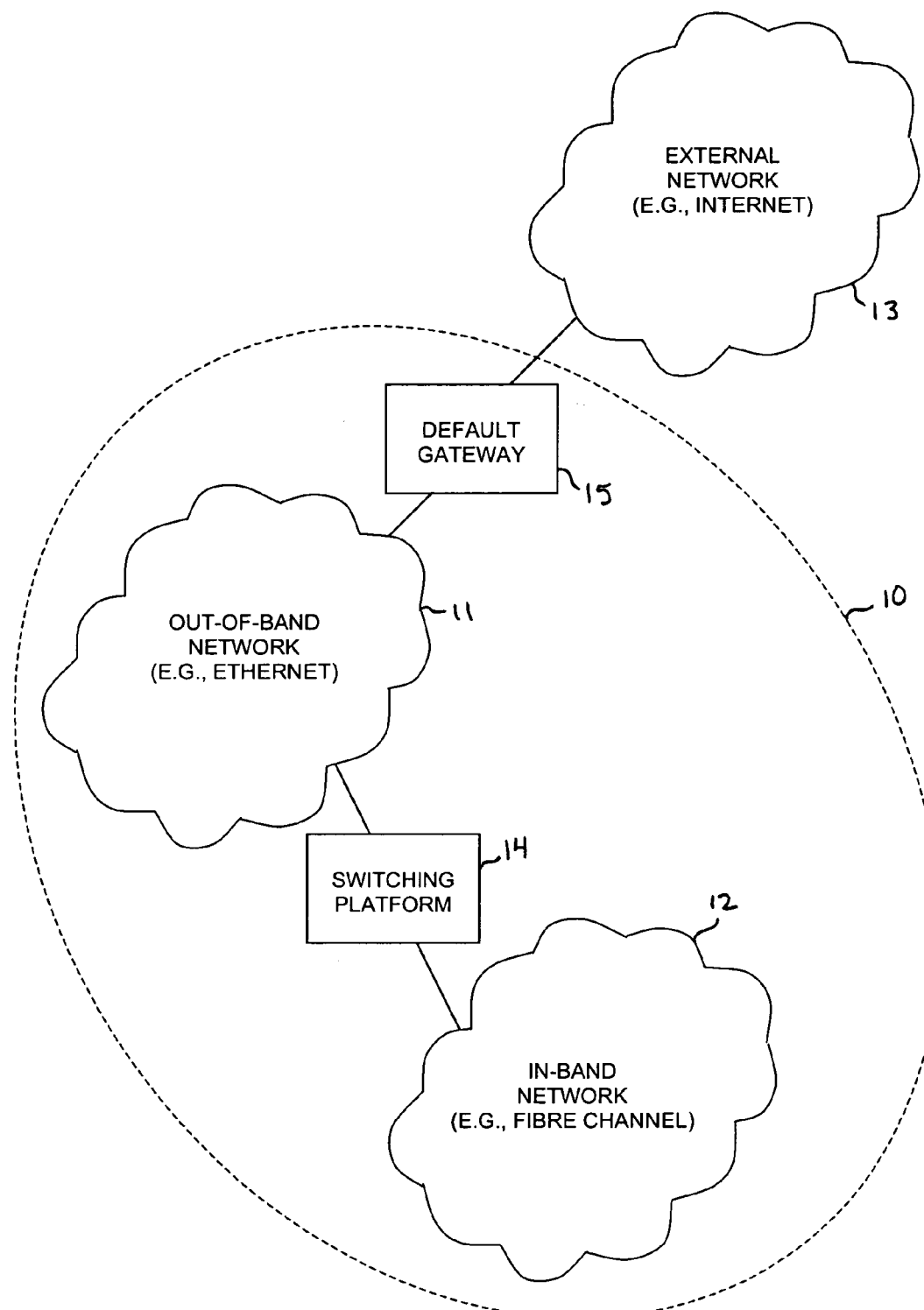
FIG. 1 is a functional block diagram of one embodiment of the present system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF THE INVENTION

A preferred embodiment of the invention is described below. It should be noted that this and any other embodiments described below are exemplary and are intended to be illustrative of the invention rather than limiting.

Broadly speaking, the present invention comprises a method and system for routing data across heterogeneous networks. In one embodiment, a switching platform is used to reformulate queries generated by a client on one sub-network and to transmit the reformulated queries to a server on a different, incompatible sub-network. Data generated by the server in response to the queries is transmitted to the switching platform, which reformats the data and transmits it to the client. In a basic embodiment, a client on the first network generates a request for information, wherein the request contains an identifier which indicates that the request is intended for the server on the second network. When the switching platform detects the identifier, the request is reformatted and transmitted to the server. The response to the request is returned to the switching platform, which reformats it and forwards it to the client. It therefore appears to the client that the response was originated by the switching platform.

Referring to FIG. 1, a functional block diagram of one embodiment of the present system is shown. In this embodiment, heterogeneous network 10 comprises a first network 11 and a second network 12. Network 11 is a general-purpose local area network of a type used in many corporate environments. Network 11 may, for example, comprise an ethernet-based system to which a variety of workstations, printers and other devices are connected.

Network 12 is a special-purpose network which is coupled to general-purpose network 11. Network 12 provides connectivity to devices which are privately accessible within heterogeneous network 10. These devices may include a variety of specialized devices which, in order to maximize their performance, are coupled to a type of network other than the general-purpose network 12. For example, the devices may comprise a plurality of data storage units for a storage area network (SAN). In this instance, network 12 may be based upon a Fibre Channel network. Network 10 is referred to as a heterogeneous network because the protocol used by network 12 is different from, and incompatible with, the protocol used by network 11.

Because network 12 is privately accessible within heterogeneous network 10, it may be referred to as an in-band network. Network 11, on the other hand, may exchange data with an external network 13 such as the Internet and may therefore be referred to as an out-of-band network. As shown in FIG. 1, the in-band and out-of-band networks are coupled to each other via a switching platform 14. As can also be seen from the figure, switching platform 14 is separate from the default gateway 15, which connects the out-of-band network to the external network 13.

The present system makes it appear to the out-of-band network that the switching platform is actually the source of all the data/services (e.g., web pages) when in fact it is not. Because the in-band network is front ended by the switching platform, there is no way for a client to realize that the switching platform is performing a bridging function to other devices. Although they look like they are all provided by the switching platform, the data/services are distributed among the in-band network devices, which can be removed, replaced, or reconfigured as necessary. When the in-band network is reconfigured, the switching platform appears to have been automatically updated to reflect the reconfigured services.

The present system permits simply browsing to the switch in the same manner as to other servers on the out-of-band network. From the point of view of the client on the out-of-band network, it looks like the switch provides a sort of all encompassing service but, from an engineering standpoint, this is achieved without having to actually implement all of the included functions in a single piece of hardware. It allows a very flexible configuration with the requirement to change anything.

The present system does not require the reconfiguration or reassignment of the default gateway for the out-of-band network. As shown in FIG. 1, the default gateway is separate from the switching platform and is not involved in the routing of the data between the in-band and out-of-band networks. The separation of the default gateway functions from those of the switching platform greatly simplifies the engineering of the switching platform, which does not have to be able to handle data which is destined for devices other than the ones connected to the in-band network.

The present system can also be implemented without requiring reconfiguration or reassignment of the proxy server for the out-of-band network. Just as with the default gateway, substantial engineering effort would be required to perform the functions of the proxy server in addition to providing connectivity to the in-band network. The system thereby simplifies handling of traffic between the in-band and out-of-band networks.

Figure 2:
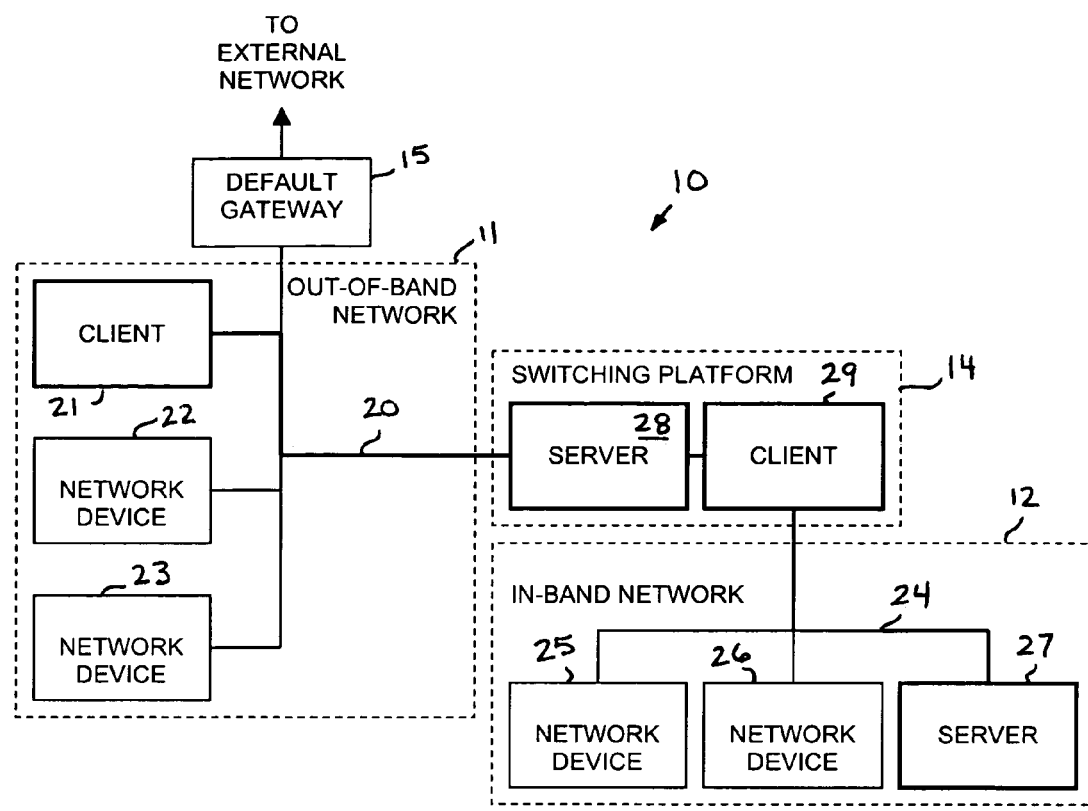
FIG. 2 a more detailed functional block diagram of the system illustrated in FIG. 1.

Referring to FIG. 2, a more detailed block diagram of the system illustrated in FIG. 1 is shown. out-of-band network 11 includes a variety of devices 21–23 which are connected to a network medium 20. In one embodiment, network medium 20 is an ethernet. In-band network 12 similarly includes a plurality of devices 25–27 which are connected to a second network medium 24. In this embodiment, network medium 24 is a Fibre Channel network. Ethernet network 20 and Fibre channel network 24 each employs a network protocol which is specifically designed for that type of network. Although both networks use TCP/IP upper-layer protocols, the respective physical layer protocols are incompatible. Consequently, data cannot simply be transmitted directly from one of the out-of-band network devices 21–23 to one of the in-band network devices 25–27. (It should be noted that the use of ethernet and Fibre Channel networks and TCP/IP or HTTP protocols in this system are illustrative of the invention, and other embodiments may use different network media or protocols.)

Out-of-band network 11 includes a client 21 which is used, at least in part, for the purpose of managing heterogeneous network 10. Client 21 may, for example, be a workstation which is used by a network administrator. The network administrator would typically use client 21 to request information from each of the devices in the network. In one embodiment, the network administrator runs a browser on client 21. The browser can be used to view a web page which includes hyperlinks to each of the network devices. When one of the hyperlinks is selected by the network administrator, an HTTP request is generated and transmitted to the device corresponding to the selected hyperlink. When the HTTP request is received by the device, a response (e.g., a responsive web page) is generated and transmitted back to the client. (Because the responding device serves a response to the HTTP request, it may be referred to as a server.) the web page which is received by client 21 can then be viewed by the network administrator and used as necessary in the management of the network.

While this process is sufficient for the management of devices in out-of-band network 11, it is not sufficient for the management of devices in in-band network 12 because the in-band and out-of-band networks use incompatible protocols. Consequently, HTTP requests which are generated by client 21 cannot simply be transmitted to devices connected to in-band network 12—these requests are not supported by the protocol of network medium 24. A means to convert the HTTP requests from the protocol of network medium 20 to the protocol of network medium 24 is necessary. This function is performed by switching platform 14.

Switching platform 14 has an interface to out-of-band network 11 (an ethernet port) which is configured to receive and transmit data which is formatted according to the protocol of that network. Likewise, switching platform 14 has an interface to in-band network 12 which is configured to transmit and receive data which is formatted according to the respective protocol. Switching platform 14 can therefore be thought of as having a server component 28 and a client component 29—it acts as a server with respect to requests received from client 21, and acts as a client with respect to data which is served by server 27. Server component 28 is configured to transmit and receive data according to the out-of-band protocol, while client component 29 is configured to transmit and receive data according to the in-band protocol. Server component 28 and client component 29 are configured to make any necessary translations or interpretations of data which is communicated between out-of-band network 11 and in-band network 12. It is important to note that the present system does not use the switching platform as a default gateway or proxy server for the out-of-band network—the system thereby avoids the problems associated with usurping the normal functions of these devices in most systems.

Figure 3:
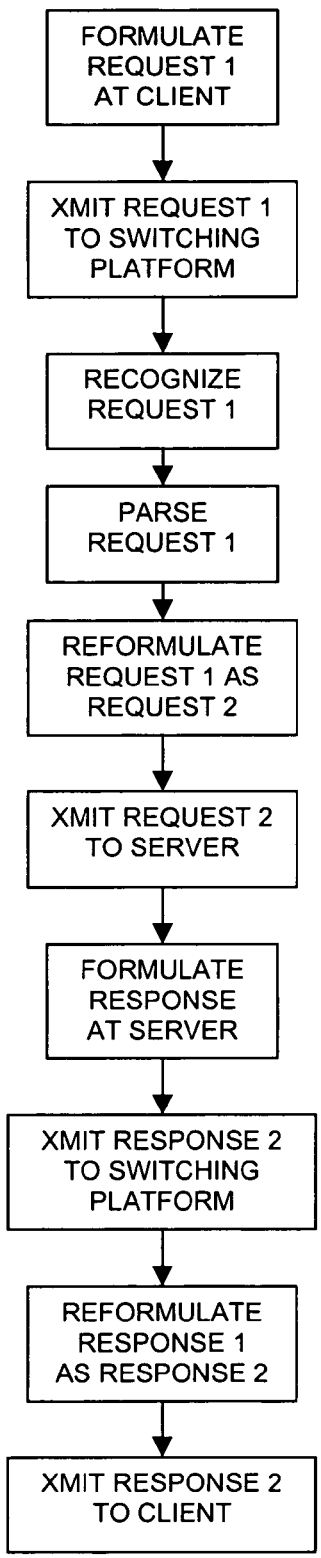
FIG. 3 is a flow diagram illustrating the method of operation of one embodiment of the present system.

Referring to FIG. 3, a flow diagram illustrating the method of operation of the present system is shown. When it is necessary for a network administrator to obtain information from one of the devices on the in-band network, a request for information (request 1) is formulated at the device on which the management function is being performed (the client). This request is formatted according to the protocol of the out-of-band network and transmitted over this network to the switching platform. When the request reaches the switching platform, the switching platform examines the request and identifies it as being directed to one of the devices on the in-band network. The switching platform then proceeds to parse the request so that it can identify the device to which the request should be forwarded, as well as the subject matter of the request. After the switching platform has identified the addressee and subject of the request, this information is used to construct a second request. The second request is formatted according to the protocol of the in-band network and is transmitted to the addressee device (the server). In other words, the switching platform effectively converts the request originally generated by the client to a request which is properly formatted for transmission over the in-band network.

When the server device receives the request from the switching platform, it generates a response to the request. If the client is a browser which has requested a web page, the server device produces the appropriate web page and transmits it to the switching platform in a format consistent with the protocol of the in-band network. The switching platform receives the responsive data from the server device and reformats it for transmission over the out-of-band network. The reformatted data is then transmitted to the client device, which utilizes the data in the same manner as data received from devices connected to the out-of-band network.

It should be noted that, from the perspective of the client device on the out-of-band network, all of the devices on the in-band network from which information is requested appear to be a single device. This single device has the address of the switching platform and includes all of the functions of the in-band network devices. As far as the network management client is concerned, the network appears to be homogeneous. This is achieved by using a URL scheme that is imposed upon the client's communications with the switching platform. (It should be noted that a URL scheme is used here because the management system is based on HTTP—other embodiments may use different protocols and different forms of data/service requests.)

The URL scheme is intended to facilitate a simple and flexible method for converting out-of-band-formatted requests and forwarding them to in-band devices. The URL that is originally generated by the out-of-band client includes specific information that the switching platform is configured to identify and recognize as indicating that the request should be passed on to an in-band network device. The information contained in the URL also allows the switching platform to quickly parse and interpret the information.

Referring to FIG. 4, an exemplary URL 30 used in one embodiment of the present system and method is shown. The information contained in the URL includes the IP address of the switching platform 31, a key word that denotes a particular format for the information in the URL 32, the IP address of the remote device 33, and the subject of the request 34.

The IP address of the switching platform is obviously used to direct the URL to the switching platform. Because this address is not relevant to the addressee device or the subject of the request, it can simply be discarded by the switching platform.

The IP address of the switching platform is followed by a key word. In the example illustrated in FIG. 4, the key word is "Profile_A." Any word may be used as a key word. "Profile_A" indicates that the information is arranged in a particular manner. In this instance, the information is arranged with the switching platform address, then the key word, then the address of the destination device, then the subject of the request, each delimited by backslashes (O). In short, the key word is followed by a complete URL that can be forwarded to the destination device. Other key words may indicate that the information is arranged in a different fashion. For example, the key word "Profile_B" may indicate that the URL contains additional, predefined types of information after the key word which have to be interpreted somehow before a URL can be generated and forwarded to the destination device. The use of key words to identify the types of information in the URL allows a great deal of flexibility in interpreting the URL and in accommodating developments relating to URLs and their structure or content. Based upon the key word, the switching platform can easily parse the URL to identify the respective types of information contained therein and construct a corresponding request (e.g., another URL) to the destination device.

As noted above, "Profile_A" indicates that the IP address of the destination device will immediately follow the key word. Upon detecting this key word, the switching platform becomes aware that it needs to format the subsequent information as a URL to be transmitted over the in-band network. This URL will be addressed to the IP address of the destination device. It should be noted that the IP address of the destination device typically is not one that exists on the Internet. As mentioned above, the in-band network is a private network and is not accessible by external networks or devices. The IP address corresponding to the destination device is most likely one that is made up by the network administrator for use within the local area network. This a very common practice.

The URL scheme is flexible in that the switching platform does not need to know what is being retrieved or to understand most of what is in that URL. It just needs to see a few identifiable parts of the URL and can process it based on those parts. After the URL is processed, the switching platform can formulate a second URL and forward it to the destination device as if the switching platform were directly requesting the subject information.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for routing data across heterogeneous networks comprising:
formulating a first request for data in a first device;
transmitting the first request to a switching device via a first network, wherein the first request is transmitted according to a first protocol;

identifying a keyword in the first request, wherein the keyword indicates the format of information in the first request;

parsing the first request based on the keyword;

formulating in the switching device a second request based on the format indicated by the keyword;

transmitting the second request to a second device via a second network, wherein the second request is transmitted according to a second protocol and wherein the second protocol is incompatible with the first protocol;

formulating a first response in the second device, wherein the first response is responsive to the second request;

transmitting the first response to the switching device via the second network, wherein the first response is transmitted according to the second protocol;

formulating in the switching device a second response corresponding to the first response; and transmitting the second response to the first device, wherein the response is transmitted according to the first protocol.

2. The method of claim 1, wherein the first request comprises a URL following the key word and wherein switching devices produces the URL following the key word as a URL corresponding to the second request.

3. The method of claim 1, further comprising detecting URLs containing the key word.

4. The method of claim 3, further comprising generating new URLs corresponding to the detected URLs, wherein the new URLs do not contain the key word.

5. A system for routing data across heterogeneous networks comprising:
    a first network operating according to a first protocol;
    a first device coupled to the first network;
    a second network operating according to a second protocol;
    a second device coupled to the second network;
    a switch coupled to the first network and the second network;
    wherein the first device is configured to generate a first request containing a keyword indicating a arrangement of information in the first request; and
    wherein the switch is configured to:
    receive the first request;
    parse the first request based on the keyword;
    generate a second request based on information in the first request;
    send the second request to the second device according to the second protocol;
    receive a first response from the second device;
    generate a second response based on the first response; and
    transmit the second response to the first device according to the first protocol.

6. The system of claim 5, wherein the first request comprises a URL corresponding to the switch, the keyword, and one or more additional URLs.

7. The system of claim 6, wherein the switch is configured to generate the second request based on the one or more additional URLs in the first request.

8. The system of claim 5, wherein the second protocol comprises a fiber channel protocol.

9. The system of claim 8, wherein the second network comprises a storage area network.

10. A system for routing data across heterogeneous networks comprising:
    a first network having a first protocol;
    a second network having a second protocol, wherein the second protocol is incompatible with the first protocol;
    a first device connected to the first network;
    a second device connected to the second network;
    a switch coupled between the first network and the second network;
    wherein the first device is configured to send an HTTP request according to the first protocol, the HTTP request includes a keyword, wherein the keyword indicates the format of information in the HTTP request;
    wherein the switch is configured to reformat the HUP request to generate a second request according to a fiber channel protocol; and
    wherein the switch is further configured to:
    parse the first request based on the keyword; and
    formulate the second request based on the format indicated by the keyword.

* * * * *